United States Patent
Chen et al.

(10) Patent No.: US 12,301,292 B2
(45) Date of Patent: May 13, 2025

(54) OPTICAL TRANSMISSION DEVICE, SYSTEM, AND METHOD

(71) Applicant: Huawei Technologies Co., Ltd., Shenzhen (CN)

(72) Inventors: Kun Chen, Dongguan (CN); Jiang Li, Dongguan (CN); Shifan Chang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 17/990,342

(22) Filed: Nov. 18, 2022

(65) Prior Publication Data

US 2023/0080248 A1 Mar. 16, 2023

Related U.S. Application Data

(63) Continuation of application No. PCT/CN2021/093267, filed on May 12, 2021.

(30) Foreign Application Priority Data

May 20, 2020 (CN) .......................... 202010430503.8

(51) Int. Cl.
*H04Q 11/00* (2006.01)
*H04B 10/50* (2013.01)
(Continued)

(52) U.S. Cl.
CPC ......... *H04B 10/504* (2013.01); *H04B 10/516* (2013.01); *H04J 14/0307* (2023.08); *H04Q 11/00* (2013.01)

(58) Field of Classification Search
CPC ................ H04Q 2011/0043; H04Q 2011/0081
See application file for complete search history.

(56) References Cited

U.S. PATENT DOCUMENTS 5,777,761 A * 7/1998 Fee ..................... H04J 14/0295
398/1
6,307,653 B1 * 10/2001 Bala ................... H04Q 11/0005
398/5
(Continued)

FOREIGN PATENT DOCUMENTS

CN 102652399 A 8/2012
CN 105099506 A 11/2015
(Continued)

OTHER PUBLICATIONS

ITU-TG.873.1(Oct. 2017), Series G: Transmission Systems and Media, Digital Systems and Networks Digital networks—Optical transport networks, Optical transport network: Linear protection, 40 pages.

*Primary Examiner* — Nathan M Cors
(74) *Attorney, Agent, or Firm* — SLATER MATSIL, LLP

(57) ABSTRACT

An optical transmission device is disclosed, comprising a tributary board, an active line board, a protection line board, an optical amplifier board, an electric cross unit, and a first multiplexer/demultiplexer board. The first three boards are electrically connected to the electric cross unit. The second to fourth boards are optically connected to the first multiplexer/demultiplexer board. A quantity of protection line boards is less than that of active line boards. A first port of the tributary board and a second port of the optical amplifier board are respectively configured to transmit client service data and an optical signal carrying the client service data. When a preset condition is met, the electric cross unit copies or schedules, to the protection line board, client service data to be processed by the active line board, and the first multiplexer/demultiplexer board performs multiplexing and demultiplexing together with the protection line board.

20 Claims, 5 Drawing Sheets

(51) Int. Cl.
*H04B 10/516* (2013.01)
*H04J 14/02* (2006.01)

(56) References Cited

U.S. PATENT DOCUMENTS

| | | | |
|---|---|---|---|
| 10,187,063 B1 | 1/2019 | Scantlin et al. | |
| 2002/0080440 A1* | 6/2002 | Li | H04J 14/0283 398/5 |
| 2002/0105696 A1* | 8/2002 | Halgren | H04Q 11/0005 398/47 |
| 2003/0090758 A1* | 5/2003 | Sparks | H04Q 11/0005 398/46 |
| 2004/0105456 A1* | 6/2004 | Lanzone | H04Q 11/0062 370/429 |
| 2004/0184714 A1* | 9/2004 | Graves | H04J 14/0212 385/16 |
| 2006/0269282 A1* | 11/2006 | Gerstel | H04Q 11/0062 398/19 |
| 2021/0135750 A1 | 5/2021 | Li et al. | |

FOREIGN PATENT DOCUMENTS

| | | |
|---|---|---|
| CN | 107846247 A | 3/2018 |
| CN | 108092734 A | 5/2018 |
| CN | 109151830 A | 1/2019 |
| CN | 109361453 A | 2/2019 |
| CN | 208508943 U | 2/2019 |
| CN | 109542693 A | 3/2019 |
| CN | 110708254 A | 1/2020 |
| CN | 111082890 A | 4/2020 |
| EP | 3393059 A1 | 10/2018 |

\* cited by examiner

OPTICAL TRANSMISSION DEVICE, SYSTEM, AND METHOD

CROSS-REFERENCE TO RELATED APPLICATIONS

This application is a continuation of International Application No. PCT/CN2021/093267, filed on May 12, 2021, which claims priority to Chinese Patent Application No. 202010430503.8, filed on May 20, 2020. The disclosures of the aforementioned applications are hereby incorporated by reference in their entireties.

TECHNICAL FIELD

This application relates to the field of optical transmission technologies, and in particular, to an optical transmission device, system, and method.

BACKGROUND

In the field of optical transmission, two optical transmission devices transmit optical signals to each other through an optical fiber. To ensure reliability of optical signal transmission, generally, redundancy protection may be added to an optical transmission device or an optical transmission system. The redundancy protection refers to adding, for a part A (such as a key channel or a key board) that performs a key function, more than one part A' that performs the same function as a protection part of A to the optical transmission device or the optical transmission system. When A is faulty, A' can be used to keep the optical transmission device or the optical transmission system in a normal working state, thereby improving reliability of optical signal transmission.

Currently, redundancy protection is generally performed in a manner of "client 1+1" or sub-network connection protection (SNCP). However, in the two protection manners, dual resource configurations are required, and a large quantity of line boards are used, resulting in relatively high redundancy protection costs.

SUMMARY

This application provides an optical transmission device, system, and method, to reduce redundancy protection costs.

According to a first aspect, this application provides an optical transmission device, including a tributary board, an electric cross unit, an active line board, a protection line board, a first multiplexer/demultiplexer board, and an optical amplifier board. A quantity of protection line boards is less than a quantity of active line boards. A first port of the tributary board is configured to transmit client service data, and the tributary board, the active line board, and the protection line board are all electrically connected to the electric cross unit. The active line board, the protection line board, and the optical amplifier board are all optically connected to the first multiplexer/demultiplexer board. A second port of the optical amplifier board is configured to transmit an optical signal that carries the client service data. When a first preset condition is met, the electric cross unit is configured to copy or schedule, to the protection line board, client service data that is to be processed by the active line board, and the first multiplexer/demultiplexer board is configured to perform multiplexing and demultiplexing in cooperation with the protection line board.

According to the optical transmission device provided in the first aspect, a plurality of active line boards share a common protection line board, making it unnecessary to perform dual configurations for the line boards, thereby reducing a quantity of protection line boards required by the optical transmission device, and reducing redundancy protection costs.

Optionally, the first preset condition includes: at least one active line board is faulty or the optical transmission device receives a line board switching instruction. It can be learned from above that, in the technical solution provided in the first aspect, a protection line board may be enabled when an active line board is faulty, or a line board switching instruction may be actively sent to the optical transmission device, so that when receiving the line board switching instruction, the optical transmission device enables a protection line board, for example, switches from a fault-free active line board to a protection line board.

Optionally, the optical transmission device further includes a second multiplexer/demultiplexer board. In this implementation, the active line board, the protection line board, and the optical amplifier board each include an optical connection element. When a second preset condition is met, the optical connection element of the active line board is configured to establish an optical channel between the active line board and the second multiplexer/demultiplexer board, the optical connection element of the protection line board is configured to establish an optical channel between the protection line board and the second multiplexer/demultiplexer board, and the optical connection element of the optical amplifier board is configured to establish an optical channel between the optical amplifier board and the second multiplexer/demultiplexer board.

In the foregoing implementation, the optical connection elements disposed on the active line board, the protection line board, and the optical amplifier board can respectively release binding relationships of the active line board, the protection line board, and the optical amplifier board with the first multiplexer/demultiplexer board, so that the active line board, the protection line board, and the optical amplifier board can respectively establish an optical channel to the second multiplexer/demultiplexer board. Therefore, even if the first multiplexer/demultiplexer board is faulty, the optical transmission device may use the second multiplexer/demultiplexer board as a protection multiplexer/demultiplexer board of the first multiplexer/demultiplexer board, and replace the first multiplexer/demultiplexer board with the second multiplexer/demultiplexer board for normal working. This ensures reliability of multiplexing and demultiplexing functions, and reliability of signal transmission of the optical transmission device.

In addition, in the foregoing implementation, because an optical connection element releases a binding relationship between an upstream or downstream board of a multiplexer/demultiplexer board and the multiplexer/demultiplexer board, although the second multiplexer/demultiplexer board is set as a protection board of the first multiplexer/demultiplexer board, it is unnecessary to configure, based on a multiple, a series of line boards and optical amplifier boards bound to the second multiplexer/demultiplexer board. This reduces costs required by redundancy protection for the multiplexer/demultiplexer board of the optical transmission device.

Optionally, the second preset condition includes: at least one first multiplexer/demultiplexer board is faulty or the optical transmission device receives a multiplexer/demultiplexer board switching instruction. That is, the second multiplexer/demultiplexer board may be enabled when a first multiplexer/demultiplexer board is faulty, or a multiplexer/demultiplexer board switching instruction may be actively sent to the optical transmission device, so that when receiving the multiplexer/demultiplexer board switching instruction, the optical transmission device enables the second multiplexer/demultiplexer board, for example, switches from a fault-free first multiplexer/demultiplexer board to the second multiplexer/demultiplexer board.

Optionally, the optical connection element includes an optical selection element and/or an optical splitting element. The optical selection element is an optical switch or a wavelength selective element. The optical switch may implement optical path switching, for example, switching from turning on a first optical path and turning off a second optical path to turning off the first optical path and turning on the second optical path. The wavelength selective element selects light in a dimension of an optical wavelength. The optical selection element ensures power of an optical signal, so that the optical transmission device is applicable to long-distance optical signal transmission.

Two output ends of the optical splitting element are respectively connected to the first multiplexer/demultiplexer board and the second multiplexer/demultiplexer board. When the optical splitting element is used to establish an optical channel, optical paths from an input end of the optical splitting element to the two output ends are always turned on, that is, a board (for example, the line board or the optical amplifier board) on which the optical splitting element is located is always connected to the first multiplexer/demultiplexer board and the second multiplexer/demultiplexer board. The optical splitting element may help detect whether an optical path is normally turned on.

Optionally, the optical transmission device further includes a first controller. The active line board, the protection line board, the first multiplexer/demultiplexer board, and the optical amplifier board are all electrically connected to the first controller. When the second preset condition is met, the first controller is configured to control both a working line board in the active line board and the protection line board and the optical amplifier board to establish an optical channel to the second multiplexer/demultiplexer board.

In this implementation, the first controller may specifically determine, based on a result of fault detection performed by the first multiplexer/demultiplexer board or an upstream or downstream board of the first multiplexer/demultiplexer board on the first multiplexer/demultiplexer board, that the first multiplexer/demultiplexer board is faulty, and determine that the optical transmission device meets the second preset condition. Alternatively, the first controller may specifically receive a multiplexer/demultiplexer board switching instruction sent by a controller outside the optical transmission device, and determine that the optical transmission device meets the second preset condition.

Optionally, the first multiplexer/demultiplexer board includes a plurality of implementations. In an example manner, the first multiplexer/demultiplexer board includes a multiplexer and a demultiplexer. In another example manner, the first multiplexer/demultiplexer board includes a wavelength selective switch WSS. The first multiplexer/demultiplexer board has multiplexing and demultiplexing functions, and wavelength selection and wavelength scheduling functions.

According to a second aspect, this application provides an optical transmission system, including a first optical transmission device and a second optical transmission device. The first optical transmission device is the optical transmission device provided in the first aspect. The second port of the optical amplifier board of the first optical transmission device is optically connected to the second optical transmission device. In a first transmission direction, the first optical transmission device is configured to receive client service data, process the client service data, and send, to the second optical transmission device through the second port of the optical amplifier board, a processed optical signal that carries the client service data; and when a first preset condition is met, the first optical transmission device enables the protection line board. In a second transmission direction, the first optical transmission device is configured to receive an optical signal of the second optical transmission device through the second port of the optical amplifier board, process the optical signal, convert the optical signal into client service data, and send the client service data to a client side; and when the first preset condition is met, the first optical transmission device enables the protection line board.

Because the first optical transmission device is the optical transmission device provided in the first aspect, redundancy protection costs can be reduced for the entire optical transmission system.

Optionally, in the optical transmission system, a manner of establishing a connection between the first optical transmission device and the second optical transmission device may include a plurality of implementations. For example, the second port of the optical amplifier board of the first optical transmission device is connected to the second optical transmission device through an optical fiber or at least one optical amplifier site. The former is applicable to short-distance transmission. The latter is applicable to long-distance transmission. For example, the first optical transmission device and the second optical transmission device are respectively disposed in different cities.

According to a third aspect, this application provides an optical transmission method, applied to the optical transmission device provided in the first aspect. The method includes: When a first preset condition is met, the electric cross unit copies or schedules, to the protection line board, client service data that is to be processed by the active line board, and the first multiplexer/demultiplexer board performs multiplexing and demultiplexing in cooperation with the protection line board.

In the optical transmission method provided in the third aspect, because the optical transmission device provided in the first aspect is used, a protection function of the protection line board in the optical transmission device may be shared by a plurality of active line boards, so that the protection line board works in place of the active line board, thereby implementing redundancy protection, and reducing redundancy protection costs.

Optionally, in the method, that the electric cross unit copies or schedules, to the protection line board, client service data that is to be processed by the active line board, and the first multiplexer/demultiplexer board performs multiplexing and demultiplexing in cooperation with the protection line board specifically includes:

In a first transmission direction, the tributary board receives client service data; the electric cross unit copies or schedules, to the protection line board, the client service data that is to be processed by the active line board; the protection line board performs electrical-to-optical conversion on the client service data; the first multiplexer/demultiplexer board receives an optical signal provided by the protection line board, to perform multiplexing; and the optical amplifier board amplifies a multiplexed optical signal, and transmits an amplified optical signal to a peer transmission device, where the optical signal carries the client service data.

In a second transmission direction, the optical amplifier board receives and amplifies an optical signal of the peer device; the first multiplexer/demultiplexer board demultiplexes an amplified optical signal to corresponding line boards, where the corresponding line boards include the protection line board; the protection line board performs optical-to-electrical conversion on a received optical signal and then provides client service data to the electric cross unit; and the electric cross unit performs scheduling to send, to a client side through the first port of the tributary board, the client service data obtained through processing by the protection line board.

Optionally, if the optical transmission device further includes the second multiplexer/demultiplexer board, the method further includes the following.

When a second preset condition is met, the optical connection elements included on the active line board and the protection line board establish an optical channel between a working line board in the active line board and the protection line board and the second multiplexer/demultiplexer board, and the optical connection element included on the optical amplifier board establishes an optical channel between the optical amplifier board and the second multiplexer/demultiplexer board.

The optical connection element of the line board releases a binding relationship between the line board and the first multiplexer/demultiplexer board, so that the line board can establish an optical channel to the second multiplexer/demultiplexer board. The optical connection element of the optical amplifier board releases a binding relationship between the optical amplifier board and the first multiplexer/demultiplexer board, so that the optical amplifier board can establish an optical channel to the second multiplexer/demultiplexer board. Therefore, even if the first multiplexer/demultiplexer board is faulty, upstream and downstream boards of the first multiplexer/demultiplexer board may be connected to the second multiplexer/demultiplexer board, to ensure normal signal transmission. In this way, working of the optical transmission device is not affected, thereby ensuring reliability of working.

In addition, the binding relationship between the line board and the first multiplexer/demultiplexer board and the binding relationship between the optical amplifier board and the first multiplexer/demultiplexer board are released, so that it is unnecessary to configure a series of matched line boards and optical amplifier boards for the second multiplexer/demultiplexer board, thereby reducing redundancy protection costs while implementing redundancy protection for the multiplexer/demultiplexer board.

According to a fourth aspect, this application further provides an optical transmission device, including: a tributary-line board, a first multiplexer/demultiplexer board, a second multiplexer/demultiplexer board, and an optical amplifier board. A first port of the tributary-line board is configured to transmit client service data. The tributary-line board and the optical amplifier board each include an optical connection element. When a second preset condition is met, the optical connection element of the tributary-line board is configured to establish an optical channel between the tributary-line board and the second multiplexer/demultiplexer board, and the optical connection element of the optical amplifier board is configured to establish an optical channel between the optical amplifier board and the second multiplexer/demultiplexer board.

In the optical transmission device provided in the fourth aspect, the optical connection elements included on the tributary-line board and the optical amplifier board release a binding relationship between the tributary-line board and the first multiplexer/demultiplexer board and a binding relationship between the optical amplifier board and the first multiplexer/demultiplexer board. Therefore, even if the first multiplexer/demultiplexer board is faulty, work of the first multiplexer/demultiplexer board may be switched to the second multiplexer/demultiplexer board by establishing the optical channel between the tributary-line board and the second multiplexer/demultiplexer board and the optical channel between the optical amplifier board and the second multiplexer/demultiplexer board, to ensure normal working of the optical transmission device. It can be learned that the disposed optical connection elements improve reliability of working of the optical transmission device.

The optical transmission device further includes a second controller. The tributary-line board, the first multiplexer/demultiplexer board, and the optical amplifier board are all electrically connected to the second controller. When the second preset condition is met, the second controller is configured to control both the tributary-line board and the optical amplifier board to establish an optical channel to the second multiplexer/demultiplexer board.

In this implementation, the second controller may specifically determine, based on a result of fault detection performed by the first multiplexer/demultiplexer board or an upstream or downstream board of the first multiplexer/demultiplexer board on the first multiplexer/demultiplexer board, that the first multiplexer/demultiplexer board is faulty, and determine that the optical transmission device meets the second preset condition. Alternatively, the second controller may specifically receive a multiplexer/demultiplexer board switching instruction sent by a controller outside the optical transmission device, and determine that the optical transmission device meets the second preset condition.

Any optical transmission device provided in the foregoing aspects may be an integrated device or a device group including a plurality of discrete devices.

It can be learned from the foregoing technical solutions that, in this application, because the protection line board may establish connections to upstream and downstream boards (the multiplexer/demultiplexer board and the electric cross unit), when the first preset condition is met, the electric cross unit performs an operation of copying or scheduling client service data that is to be processed by the active line board, so that the protection line board may be enabled in the optical transmission device to function in place of the active line board. This implements redundancy protection for the optical transmission device. Because the quantity of protection line boards is less than the quantity of active line boards, a protection function of a protection line board of the optical transmission device may be shared by a plurality of active line boards, so that redundancy protection costs can be reduced.

DETAILED DESCRIPTION OF ILLUSTRATIVE EMBODIMENTS

Figure 1:
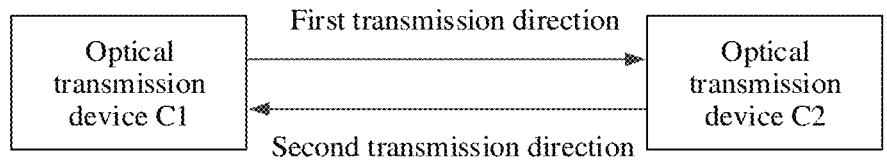
FIG. 1 is a schematic diagram of an optical transmission scenario.

To make persons skilled in the art better understand technical solutions provided in embodiments of this application, an optical transmission scenario is first described. The optical transmission scenario generally includes a plurality of optical transmission devices. The following describes, with reference to an optical transmission scenario shown in FIG. 1, an implementation process in which two optical transmission devices C1 and C2 transmit optical signals.

In the embodiments of this application, a direction in which a local optical transmission device transmits an optical signal to a peer optical transmission device is defined as a first transmission direction, and a direction in which the peer optical transmission device transmits an optical signal to the local optical transmission device is defined as a second transmission direction. In the scenario shown in FIG. 1, the optical transmission device C1 may be used as a local optical transmission device, and the optical transmission device C2 may be used as a peer optical transmission device. In actual application, the optical transmission devices C1 and C2 may be respectively located at different geographical locations, and have a relatively long optical transmission distance. For example, the optical transmission device C1 is located in Shenzhen, and the optical transmission device C2 is located in Beijing.

In the first transmission direction, the optical transmission device C1 receives client service data from a client side, processes the client service data, converts the client service data into an optical signal (for example, an optical signal suitable for long-distance transmission), and then transmits the optical signal to the optical transmission device C2 over a long distance. In the second transmission direction, the optical transmission device C1 receives an optical signal sent by the optical transmission device C2, the optical transmission device C1 processes the optical signal, converts the optical signal into client service data, and then sends the client service data to the client side. The client side refers to a client-facing working device. For example, the client side may be a router or an access device. The client service data may be transmitted in a form of an optical signal or an electrical signal.

The optical transmission device in the optical transmission scenario is usually provided with a plurality of types of boards, for example, a tributary board, an electric cross unit, a line board, a tributary-line board, a multiplexer/demultiplexer board, and an optical amplifier board. The tributary board is configured to receive client service data from a client side, convert an optical signal into an electrical signal, encapsulate and map a service into an optical data unit k (ODUk), and send the ODUk to the electric cross unit for scheduling. The tributary board can also implement an inverse process of the foregoing process. The electric cross unit is configured to schedule electrical signals between the tributary board and the line board. The line board is configured to multiplex and map the electrical signal of the ODUk scheduled from the electric cross unit, and implement mutual conversion between the electrical signal and an optical signal of an Optical Transport Unit k (OTUk) of a standard wavelength that meets a requirement of a wavelength division multiplexing (WDM) system. The line board can also implement an inverse process of the foregoing process. The tributary-line board is a type of OTU boards. The tributary-line board combines functions of the tributary board and the line board, and can output an optical signal of the standard wavelength that meets the requirement of the WDM system. The tributary-line board can also implement an inverse process of the foregoing process. The multiplexer/demultiplexer board is configured to perform multiplexing or demultiplexing processing on optical signals of different wavelengths. A multiplexing function of the board is embodied in multiplexing a plurality of optical signals that comply with the WDM standard wavelength into one optical signal in the first transmission direction. A demultiplexing function of the board is embodied in demultiplexing one optical signal into a plurality of optical signals that comply with the WDM standard wavelength in the second transmission direction. The optical amplifier board is an optical amplifier (OA), configured to implement power amplification at an optical layer. When long-distance transmission of an optical signal is required, the optical amplifier board may be used to amplify optical power. The optical amplifier board can also implement an inverse process of the foregoing process.

It can be learned from the foregoing function descriptions of the boards of the optical transmission device that, when the optical transmission device C1 and the optical transmission device C2 transmit optical signals, the two devices may specifically establish an optical connection by using the optical amplifier board.

To improve reliability of working of an optical transmission device or an optical transmission system (including a plurality of optical transmission devices), currently, redundancy protection may be performed in a manner of "client 1+1" or SNCP, to prevent the device or the system from stopping working when a board is faulty. In the "client 1+1" solution, a backup configuration needs to be performed for each board and fiber link of a local transmission device and a peer optical transmission device, which is costly. Compared with the "client 1+1" solution, the SNCP redundancy protection solution omits a backup configuration for a tributary board, while other boards still need backup configurations. Therefore, protection costs are still high.

Based on the foregoing problem, embodiments of this application provide an optical transmission device, system, and method. In the technical solutions provided in the embodiments of this application, a protection line board is disposed in the optical transmission device, and a quantity of protection line boards is less than a quantity of active line boards. When a first preset condition (for example, an active line board is faulty) is met, an electric cross unit performs an operation of copying or scheduling client service data that is to be processed by the active line board, so that the optical transmission device enables the protection line board to function in place of the active line board. This implements redundancy protection for the optical transmission device. Because the quantity of protection line boards is less than the quantity of active line boards, a protection function of a protection line board may be shared by a plurality of active line boards, so that redundancy protection costs can be reduced.

The following describes, with reference to accompanying drawings and embodiments, the optical transmission device provided in the embodiments of this application.

Figure 2:
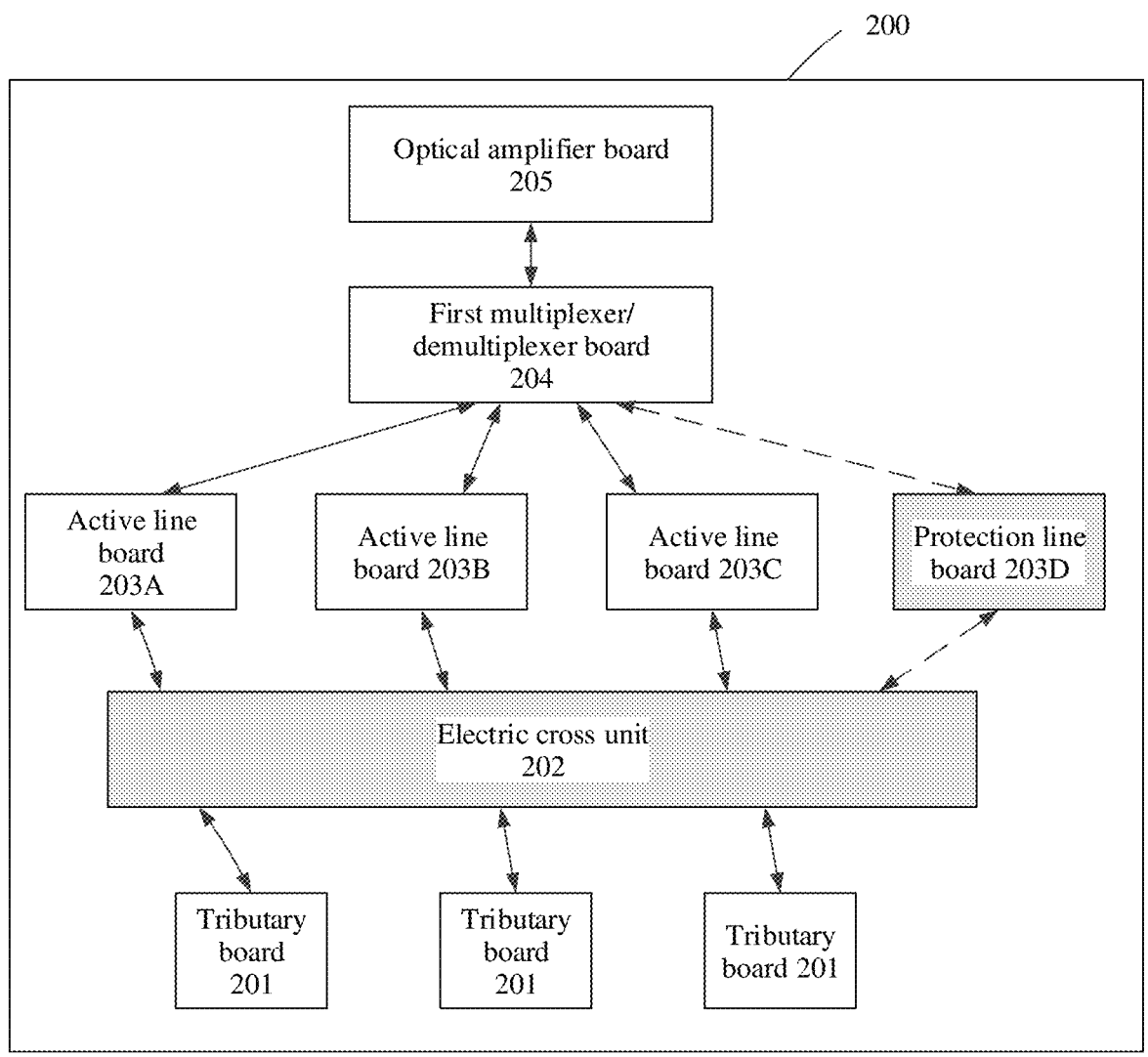
FIG. 2 is a schematic diagram of a structure of an optical transmission device according to an embodiment of this application.

FIG. 2 is a schematic diagram of a structure of an optical transmission device 200 according to an embodiment of this application. The optical transmission device 200 includes a tributary board 201, an electric cross unit 202, active line boards (203A, 203B, and 203C), a protection line board 203D, a first multiplexer/demultiplexer board 204, and an optical amplifier board 205. In the optical transmission device 200, a quantity N of protection line boards is less than a quantity M of active line boards. Both M and N are positive integers, and N is greater than or equal to 1. A total quantity of tributary boards 201 may be the same as or different from that of active line boards. FIG. 2 shows an example of three tributary boards 201, three active line boards, and one protection line board. In another example, other quantities of active line boards and protection line boards, for example, 100 active line boards and 10 protection line boards, may be disposed.

A first port of the tributary board 201 is configured to transmit client service data. The "transmit" herein may include send and/or receive. For example, the tributary board 201 is responsible for receiving client service data from a client side in a first transmission direction, and is responsible for sending client service data to the client side in a second transmission direction. In addition, transmission actions in the first transmission direction and the second transmission direction may be performed simultaneously based on an actual service requirement.

As shown in FIG. 2, the tributary board 201, all the active line boards 203A to 203C, and the protection line board 203D are all electrically connected to the electric cross unit 202. The active line boards 203A to 203C, the protection line board 203D, and the optical amplifier board 205 are all optically connected to the first multiplexer/demultiplexer board 204.

In the example of FIG. 2, each tributary board corresponds to a different active line board 203A, 203B, or 203C. In the first transmission direction, a signal processed by each tributary board 201 is scheduled by the electric cross unit 202, and sent to the active line board corresponding to the tributary board 201. In the second transmission direction, signals processed by the active line boards 203A to 203C are scheduled by the electric cross unit 202, and sent to corresponding tributary boards 201.

The first multiplexer/demultiplexer board 204 provides a multiplexing function in the first transmission direction, and provides a demultiplexing function in the second transmission direction. When all the active line boards 203A to 203C work in the first transmission direction, the first multiplexer/demultiplexer board 204 is configured to multiplex, to the optical amplifier board 205, optical waves provided by the active line boards 203A to 203C. When all the active line boards 203A to 203C work in the second transmission direction, the first multiplexer/demultiplexer board 204 is configured to demultiplex an optical wave from the optical amplifier board 205 to the active line boards 203A to 203C.

The optical amplifier board 205 provides a function of amplifying optical power in the first transmission direction and the second transmission direction. The optical transmission device 200 is used as a local optical transmission device, a second port of the optical amplifier board 205 is a port that is on the optical amplifier board 205 and that establishes an optical connection to a peer optical transmission device, and the second port is configured to transmit an optical signal that carries client service data. The "transmit" herein may include send and/or receive.

In a possible implementation, the optical amplifier board 205 includes a first OA and a second OA. The first OA works in the first transmission direction, and the second OA works in the second transmission direction. In another possible implementation, the optical amplifier board 205 includes a multi-stage OA, and the multi-stage OA is configured to amplify, stage by stage, an optical signal received by the optical amplifier board 205.

In this embodiment of this application, a trigger condition for enabling the protection line board 203D, that is, a first preset condition, is preset. For example, the first preset condition includes: at least one active line board is faulty or the optical transmission device 200 receives a line board switching instruction. The following specifically describes the two trigger scenarios of enabling the protection line board. In the following scenarios, it is assumed that work of the active line board 203C is switched to the protection line board 203D.

(1) Trigger Scenario: An Active Line Board is Faulty.

It is assumed that the active line boards 203A and 203B work normally, the active line board 203C is faulty, and the protection line board 203D is in an idle state. Based on the foregoing description, it may be determined that the optical transmission device 200 meets the first preset condition. To enable the optical transmission device 200 to work normally and not to be affected by the faulty active line board 203C, the protection line board 203D needs to work in place of the faulty active line board 203C.

On the premise that the first preset condition is met, the electric cross unit 202 of the optical transmission device 200 is configured to transmit, to the protection line board 203D for processing, client service data that is to be processed by the faulty active line board 203C. Herein, the client service data that is to be processed by the active line board 203C is specifically client service data carried in a signal that is to be sent to the active line board 203C when the active line board 203C is in a normal state.

The first transmission direction is used as an example. In a possible implementation, before it is determined that the first preset condition is met, the electric cross unit 202 may copy client service data that is to be processed by any active line board 203A, 203B, or 203C, and send a copy to the protection line board 203D. If the client service data that is copied and sent in advance is exactly the client service data that is to be processed by the active line board 203C, the optical transmission device 200 may directly enable the protection line board 203D when the active line board 203C is faulty. If the client service data that is copied and sent in advance is not the client service data that is to be processed by the active line board 203C, when it is determined that the active line board 203C is faulty, the electric cross unit 202 needs to temporarily schedule, to the protection line board 203D, the client service data that is to be processed by the active line board 203C.

In another possible implementation, the electric cross unit 202 may not perform a pre-copy operation. When it is determined that an active line board is faulty, the electric cross unit 202 temporarily schedules, to the protection line board 203D, client service data that is to be processed by the faulty active line board.

A copying or scheduling operation in the second transmission direction is similar to that in the first transmission direction, and details are not described herein again.

(2) Trigger Scenario: Active Switching Between Line Boards.

In actual application, a controller outside the optical transmission device 200 may generate a line board switching instruction based on signal processing of each line board or based on a requirement for working sustainability of the optical transmission device when no line board is faulty, and send the instruction to the optical transmission device 200 to actively switch a working line board. In a possible implementation, the line board switching instruction may carry an identifier of a switched-from line board and an identifier of a switched-to line board. After receiving the line board switching instruction, the optical transmission device 200 switches work of the active line board 203C to the protection line board 203D for execution.

In this embodiment of this application, the operation of copying or scheduling, by the electric cross unit 202 to the protection line board 203D, the client service data that is to be processed by the active line board 203C may be understood as changing an original correspondence of the tributary board 201 with a line board. In this example scenario, the tributary board 201 originally corresponding to the active line board 203C is changed to corresponding to the protection line board 203D.

In the foregoing embodiment, the protection line board may be enabled in the optical transmission device to function in place of the active line board. This implements redundancy protection for the optical transmission device. Because the quantity of protection line boards is less than the quantity of active line boards, that is, the line boards in the optical transmission device are not subject to 1:1 dual configurations, a protection function of a protection line board may be shared by a plurality of active line boards. For example, if one protection line board is disposed in the optical transmission device, redundancy protection for the M active line boards is implemented by the one protection line board. If the quantity N of protection line boards is greater than 1, redundancy protection for the M active line boards is implemented by the N protection line boards. Compared with an existing solution, the optical transmission device provided in this embodiment reduces a quantity of configured line boards, and can reduce device costs.

A multiplexer/demultiplexer board in an optical transmission device is generally optically connected to a plurality of line boards. In the optical transmission device 200 shown in FIG. 2, the first multiplexer/demultiplexer board 204 is connected to the active line boards 203A to 203C. In actual application, one multiplexer/demultiplexer board may be connected to dozens or even hundreds of line boards. Working performance of the multiplexer/demultiplexer board affects working reliability of the entire optical transmission device. Similar to the line board, the multiplexer/demultiplexer board may also fail. When a multiplexer/demultiplexer board is faulty, all services related to the multiplexer/demultiplexer board are affected if no other board functions in place of the board. Due to binding relationships between the multiplexer/demultiplexer board and the line boards, when redundancy protection is required for the multiplexer/demultiplexer board, a series of line boards need to be added based on a multiple. For example, the first multiplexer/demultiplexer board is configured to optically connect to 10 line boards. If a second multiplexer/demultiplexer board is used to perform redundancy protection for the first multiplexer/demultiplexer board, usually, 10 matched line boards optically connected to the second multiplexer/demultiplexer board need to be added.

To improve working reliability of the optical transmission device, based on the foregoing embodiment, this application further provides another optical transmission device. An optical connection element is disposed on the line board, to release the inherent binding relationship between the multiplexer/demultiplexer board and the line board. Therefore, it is unnecessary to add a large quantity of matched line boards for redundancy protection of the multiplexer/demultiplexer board.

Figure 3:
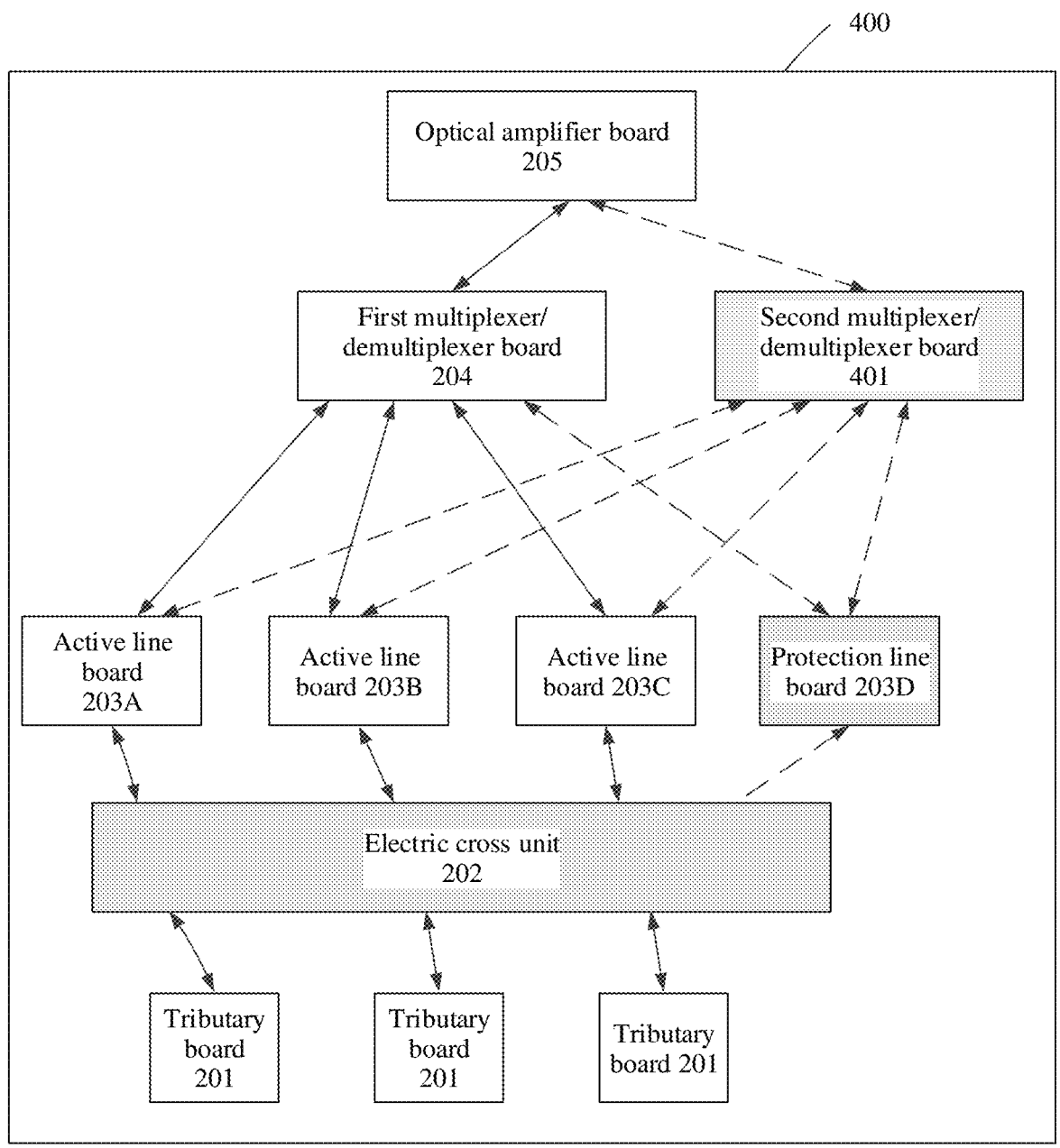
FIG. 3 is a schematic diagram of a structure of another optical transmission device according to an embodiment of this application.

FIG. 3 is a schematic diagram of a structure of the optical transmission device 400. Compared with the optical transmission device 200 shown in FIG. 2, the optical transmission device 400 further includes a second multiplexer/demultiplexer board 401, as shown in FIG. 3.

The optical transmission device 400 includes one first multiplexer/demultiplexer board 204 and one second multiplexer/demultiplexer board 401. In actual application, other quantities of first multiplexer/demultiplexer boards 204 and second multiplexer/demultiplexer boards 401 may be disposed. For example, five first multiplexer/demultiplexer boards 204 and three second multiplexer/demultiplexer boards 401 are disposed. In this embodiment of this application, a quantity of first multiplexer/demultiplexer boards 204 is greater than or equal to a quantity of second multiplexer/demultiplexer boards 401. In the optical transmission device 400 provided in this embodiment, the first multiplexer/demultiplexer board 204 is used as an active board, and the second multiplexer/demultiplexer board 401 is used as a protection board.

In the optical transmission device 400, functions of the second multiplexer/demultiplexer board 401 and the first multiplexer/demultiplexer board 204 are the same. In this embodiment of this application, a trigger condition for enabling the second multiplexer/demultiplexer board 401, that is, a second preset condition, is preset. In actual application, the optical transmission device 400 may enable the second multiplexer/demultiplexer board 401 in a plurality of trigger scenarios. Therefore, the second preset condition is set based on different trigger scenarios. For example, the second preset condition includes: at least one first multiplexer/demultiplexer board is faulty or the optical transmission device 400 receives a multiplexer/demultiplexer board switching instruction.

All the line boards 203A to 203D and the optical amplifier board 205 each include an optical connection element. When the optical transmission device 400 does not meet the second preset condition, the optical connection element is configured to establish an optical channel between a board on which the optical connection element is located and the first multiplexer/demultiplexer board 204. When the optical transmission device 400 meets the second preset condition, the optical connection element is configured to establish an optical channel between the board on which the optical connection element is located and the second multiplexer/demultiplexer board 401. Specifically, on the premise that the optical transmission device 400 meets the second preset condition, the optical connection element of the active line board 203A, 203B, or 203C is configured to establish an optical channel between the active line board and the second multiplexer/demultiplexer board 401, the optical connection element of the protection line board 203D is configured to establish an optical channel between the protection line board 203D and the second multiplexer/demultiplexer board 401, and the optical connection element of the optical amplifier board 205 is configured to establish an optical channel between the optical amplifier board 205 and the second multiplexer/demultiplexer board 401.

The following specifically describes the two trigger scenarios of enabling the second multiplexer/demultiplexer board 401. In the following scenarios, it is assumed that work of the first multiplexer/demultiplexer board 204 is switched to the second multiplexer/demultiplexer board 401.

(1) Trigger Scenario: The First Multiplexer/Demultiplexer Board is Faulty.

In this trigger scenario, the second preset condition includes: at least one first multiplexer/demultiplexer board 204 is faulty. In this scenario, the second multiplexer/demultiplexer board 402 is in an idle state. Based on the foregoing description, it may be learned that the optical transmission device 400 meets the second preset condition. To enable the optical transmission device 400 to work normally and not to be affected by the faulty first multiplexer/demultiplexer board 204, the second multiplexer/demultiplexer board 402 needs to work in place of the faulty first multiplexer/demultiplexer board 204.

Because the functions of the second multiplexer/demultiplexer board 401 and the first multiplexer/demultiplexer board 204 are the same, after optical connection elements of common upstream and downstream boards (the optical amplifier board 205 and the working line boards 203A to 203C) of the first multiplexer/demultiplexer board 204 and the second multiplexer/demultiplexer board 401 establish optical channels between the second multiplexer/demultiplexer board 401 and the boards on which the optical connection elements are located, the second multiplexer/demultiplexer board 401 may be smoothly enabled to function in place of the faulty first multiplexer/demultiplexer board 204.

Specifically, in the first transmission direction, the second multiplexer/demultiplexer board 402 receives optical waves of the working line boards 203A to 203C, and multiplexes the optical waves to the optical amplifier board 205. In the second transmission direction, the second multiplexer/demultiplexer board 402 receives an optical wave from the optical amplifier board 205, and then demultiplexes the optical wave to the active line boards 203A to 203C.

(2) Trigger Scenario: Active Switching Between Multiplexer/Demultiplexer Boards.

In this trigger scenario, the second preset condition includes: the optical transmission device 400 receives a multiplexer/demultiplexer board switching instruction sent by a controller outside.

In a possible implementation, the multiplexer/demultiplexer board switching instruction may carry an identifier of a switched-from multiplexer/demultiplexer board and an identifier of a switched-to multiplexer/demultiplexer board. After receiving the multiplexer/demultiplexer board switching instruction, the optical transmission device 400 switches work of the first multiplexer/demultiplexer board 204 to the second multiplexer/demultiplexer board 401 for execution, and the first multiplexer/demultiplexer board 204 is disabled.

In this embodiment of this application, that the optical connection element establishes the optical channel between the board on which the optical connection element is located and the second multiplexer/demultiplexer board 402 may be understood as changing a correspondence of the board on which the optical connection element is located with a multiplexer/demultiplexer board. In this example scenario, the board (the line boards 203A to 203D or the optical amplifier board 205) originally corresponding to the first multiplexer/demultiplexer board 201 is changed to corresponding to the second multiplexer/demultiplexer board 401.

In the foregoing embodiment, when the optical transmission device 400 meets the second preset condition (for example, the first multiplexer/demultiplexer board is faulty), optical connection elements included on upstream and downstream boards of the first multiplexer/demultiplexer board 204 establish optical channels between the second multiplexer/demultiplexer board 401 and the boards, so that the optical transmission device 400 may enable the second multiplexer/demultiplexer board 401 to function in place of the first multiplexer/demultiplexer board 204. This implements redundancy protection for the multiplexer/demultiplexer board of the optical transmission device 400. In this way, even if the first multiplexer/demultiplexer board 204 is faulty, the optical transmission device 400 is not affected, and the optical transmission device 400 can work normally. It can be learned that the second multiplexer/demultiplexer board 401 and the optical connection elements of the upstream and downstream boards of the second multiplexer/demultiplexer board release the binding relationship between the line board and the first multiplexer/demultiplexer board, and release the binding relationship between the optical amplifier board and the multiplexer/demultiplexer board. Therefore, redundancy protection for the multiplexer/demultiplexer board is implemented at relatively low redundancy protection costs, and reliability of working of the optical transmission device 400 is improved.

The optical connection element may include two connection sub-elements. A first connection sub-element is configured to: when the optical transmission device 400 meets the second preset condition in the first transmission direction, establish an optical channel between a board on which the optical connection element is located and the second multiplexer/demultiplexer board 401. A second connection sub-element is configured to: when the optical transmission device 400 meets the second preset condition in the second transmission direction, establish an optical channel between the board on which the optical connection element is located and the second multiplexer/demultiplexer board 401.

In actual application, if the optical transmission device 400 meets the second preset condition only in the first transmission direction, the optical channel to the second multiplexer/demultiplexer board 401 may be established only by using the first connection sub-element, to implement normal optical transmission in the first transmission direction. The second connection sub-element is still connected to the first multiplexer/demultiplexer board 204.

Similarly, if the optical transmission device 400 meets the second preset condition only in the second transmission direction, the optical channel to the second multiplexer/demultiplexer board 401 may be established only by using the second connection sub-element, to implement normal optical transmission in the second transmission direction. The first connection sub-element is still connected to the first multiplexer/demultiplexer board 204.

If the optical transmission device 400 meets the second preset condition in both the first transmission direction and the second transmission direction, both the first connection sub-element and the second connection sub-element are connected to the second multiplexer/demultiplexer board 401. That is, the second multiplexer/demultiplexer board 401 functions in place of the first multiplexer/demultiplexer board 204 in both the first transmission direction and the second transmission direction.

In the optical connection element of the line board, the first connection sub-element may be an optical selection element or an optical splitting element, and the second connection sub-element may be an optical selection element. For the optical connection element of the line board, the optical selection element as a first connection sub-element implements selective transmission of an optical signal, that is, selectively sends the optical signal to the second multiplexer/demultiplexer board 401, the optical splitting element as a first connection sub-element implements dual transmission of an optical signal, that is, respectively sends the optical signal to the first multiplexer/demultiplexer board 204 and the second multiplexer/demultiplexer board 401, and the optical selection element as a second connection sub-element implements selective reception of an optical signal, that is, selectively receives an optical signal from the second multiplexer/demultiplexer board 401.

Figure 4:
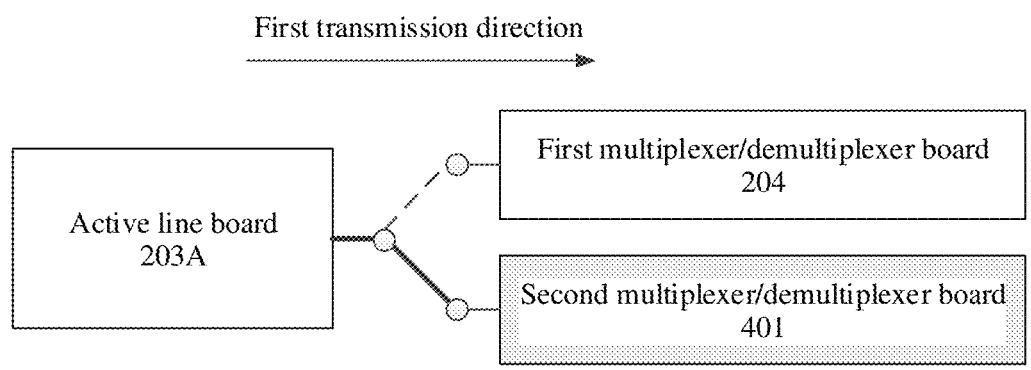
FIG. 4 is a schematic diagram of establishing an optical channel to a second multiplexer/demultiplexer board by a first connection sub-element of a line board.

Using the active line board 203A as an example, FIG. 4 shows a schematic diagram of establishing an optical channel to the second multiplexer/demultiplexer board 402 by using an optical selection element and an optical splitting element as first connection sub-elements. In FIG. 4, a solid connection line between the active line board 203A and the second multiplexer/demultiplexer board 401 represents an optical channel established by using the optical selection element as a first connection sub-element. When the optical splitting element is used as a first connection sub-element, both the solid connection line and a dashed connection line in FIG. 4 represent optical paths turned on. When the line board uses the optical selection element as a second connection sub-element, refer to the solid connection line in FIG. 4 for a schematic diagram of establishing an optical channel to the second multiplexer/demultiplexer board 402 by the optical selection element.

In the optical connection element included on the optical amplifier board 205, the first connection sub-element may be an optical selection element, and the second connection sub-element may be an optical selection element or an optical splitting element. For the optical connection element of the optical amplifier board 205, the optical selection element as a first connection sub-element implements selective reception of an optical signal, that is, selectively receives an optical signal from the second multiplexer/demultiplexer board 401, the optical selection element as a second connection sub-element implements selective transmission of an optical signal, that is, selectively sends the optical signal to the second multiplexer/demultiplexer board 401, the optical splitting element as a second connection sub-element implements dual transmission of an optical signal, that is, respectively sends the optical signal to the first multiplexer/demultiplexer board 204 and the second multiplexer/demultiplexer board 401.

Figure 5:
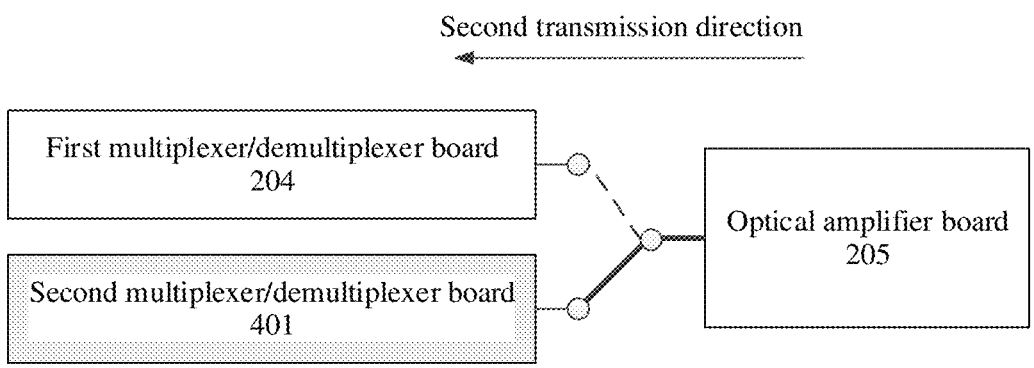
FIG. 5 is a schematic diagram of establishing an optical channel to a second multiplexer/demultiplexer board by a second connection sub-element of an optical amplifier board.

Using the optical amplifier board 205 as an example, FIG. 5 shows a schematic diagram of establishing an optical channel to the second multiplexer/demultiplexer board 402 by using an optical selection element and an optical splitting element as second connection sub-elements. In FIG. 5, a solid connection line between the optical amplifier board 205 and the second multiplexer/demultiplexer board 401 represents an optical channel established by using the optical selection element as a second connection sub-element. When the optical splitting element is used as a second connection sub-element, both the solid connection line and a dashed connection line in FIG. 5 represent optical paths turned on. When the optical amplifier board 205 uses the optical selection element as a first connection sub-element, refer to the solid connection line in FIG. 5 for a schematic diagram of establishing an optical channel to the second multiplexer/demultiplexer board 402 by the optical selection element.

With reference to the solid connection line and the dashed connection line in FIG. 4, and the solid connection line and the dashed connection line in FIG. 5, it can be learned that when the optical splitting element provides a dual transmission function, two output ends of the optical splitting element are respectively connected to the first multiplexer/demultiplexer board 204 and the second multiplexer/demultiplexer board 401. When an optical signal is input to the optical splitting element, the optical splitting element respectively provides the optical signal to the first multiplexer/demultiplexer board 204 and the second multiplexer/demultiplexer board 401 after optical splitting along two optical paths. Because the optical splitting element has an optical splitting function, power of an optical signal output by the optical splitting element along a single optical path is lower than that of an optical signal at an input end of the optical splitting element. Therefore, when a transmission distance between the local optical transmission device and the peer optical transmission device is relatively short, it is appropriate to use the optical splitting element in the optical connection element of the local optical transmission device to implement a dual transmission function.

With reference to the solid connection line of FIG. 4 and the solid connection line of FIG. 5, it can be learned that when the optical selection element provides a selective transmission or selective reception function, an optical signal passes only one multiplexer/demultiplexer board connected to the optical selection element. Therefore, power of the optical signal is not distributed to another multiplexer/demultiplexer board, that is, power of an optical signal output by the optical selection element does not change significantly with respect to an optical signal at an input end of the optical selection element. When a transmission distance between the local optical transmission device and the peer optical transmission device is relatively long, it is appropriate to use the optical selection element in the optical connection element of the local optical transmission device to implement a selective transmission or selective reception function.

The optical selection element shown in FIG. 4 and FIG. 5 is an optical switch, and an optical path is selected in a dimension of a spatial optical path by using the optical switch. In this implementation, each working line board corresponds to a different optical wavelength. For example, the active line board 203A corresponds to a first wavelength, the active line board 203B corresponds to a second wavelength, and the active line board 203C corresponds to a third wavelength.

In addition, in actual application, each line board of the optical transmission device 400 may be a line board with relatively high integration, and includes a plurality of submodules, and each submodule corresponds to a plurality of different optical wavelengths. Similarly, each optical amplifier board 205 may be an optical amplifier board with relatively high integration, and includes a plurality of submodules, and each submodule corresponds to a plurality of different optical wavelengths. In this implementation, a wavelength selective element may be used as an optical selection element. Light is selected in a dimension of an optical wavelength by using the wavelength selective element. A wavelength selective element of the line board is used as an example. In the first transmission direction, when the second preset condition is met, the wavelength selective element of the line board establishes an optical channel to the second multiplexer/demultiplexer board 401, and sends light of a first wavelength to the second multiplexer/demultiplexer board 401.

Figure 6:
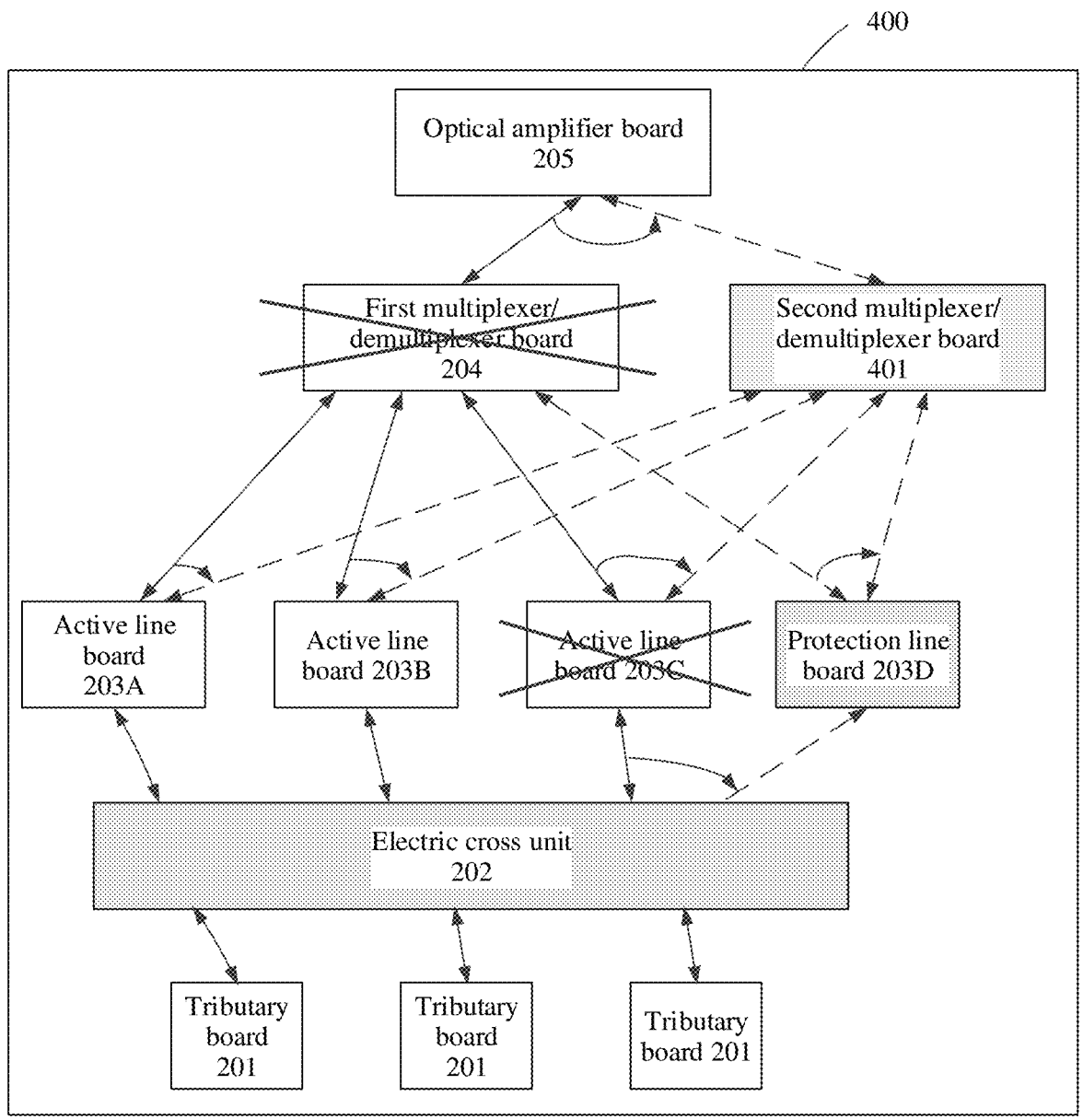
FIG. 6 is a schematic diagram of enabling a protection line board and a second multiplexer/demultiplexer board by the optical transmission device shown in FIG. 3.

Assuming that the optical transmission device 400 shown in FIG. 3 meets both the first preset condition and the second preset condition, both the protection line board 203D and the second multiplexer/demultiplexer board 401 are enabled. In an example scenario, both the active line board 203C and the first multiplexer/demultiplexer board 204 are faulty. FIG. 6 is a schematic diagram of enabling the protection line board 203D and the second multiplexer/demultiplexer board 401 by the optical transmission device 400. As shown in FIG. 6, the protection line board 203D works in place of the active line board 203C, and the second multiplexer/demultiplexer board 401 works in place of the first multiplexer/demultiplexer board 204.

In a possible implementation, the optical transmission devices 200 and 400 may further include a first controller. The following describes an implementation and a function of the first controller by using the optical transmission device 400 as an example.

In the optical transmission device 400, each board (for example, the tributary board 201, the electric cross unit 202, the line boards 203A to 203D, the first multiplexer/demultiplexer board 204, the second multiplexer/demultiplexer board 401, and the optical amplifier board 205) may be electrically connected to the first controller. Herein, the electrical connection may be a wired connection or a wireless connection. Each board electrically connected to the first controller may communicate with the first controller.

Each board may implement fault self-detection, or fault detection may be implemented by an upstream or downstream board of the board.

For example, the line boards 203A to 203D may feed back fault detection results to the first controller after fault self-detection, or the electric cross unit 202 or a working multiplexer/demultiplexer board (the first multiplexer/demultiplexer board 204 or the second multiplexer/demultiplexer board 401) may feed back fault detection results to the first controller after performing fault detection on the line boards. If a fault detection result indicates that a line board is faulty, the optical transmission device 400 meets the first preset condition. The first controller may be configured to control scheduling of the electric cross unit 202 and the working multiplexer/demultiplexer board (for example, the first multiplexer/demultiplexer board 204), for example, scheduling client service data that is to be processed by the faulty active line board 203C to the idle protection line board 203D, and scheduling, to the protection line board 203D, an optical signal that is to be scheduled by the first multiplexer/demultiplexer board 204 to the active line board 203C.

For example, the first multiplexer/demultiplexer board 204 may feed back a fault detection result to the first controller after fault self-detection, or the optical amplifier board 205 or a working line board may feed back a fault detection result to the first controller after performing fault detection on the first multiplexer/demultiplexer board. If the fault detection result indicates that the first multiplexer/demultiplexer board is faulty, the optical transmission device 400 meets the second preset condition. The first controller may be configured to control both the working line board in the line boards 203A to 203D and the optical amplifier board 205 to establish an optical channel to the second multiplexer/demultiplexer board 401.

When receiving the fault detection result, the first controller may send a control instruction to a corresponding board, to enable the protection line board 203D or the second multiplexer/demultiplexer board 401. Alternatively, the first controller may receive a line board switching instruction or a multiplexer/demultiplexer board switching instruction sent by a controller outside the device, and then control a board inside the device to enable a switched-to line board or multiplexer/demultiplexer board. If the optical transmission device 400 further includes an input module (for example, a touchscreen or a keyboard), and the input module is electrically connected to the first controller, the input module may send a line board switching instruction or a multiplexer/demultiplexer board switching instruction to the first controller in response to an operation of a user.

In the optical transmission device 200 and the optical transmission device 400, the first multiplexer/demultiplexer board 204 may be implemented by using a wavelength selective switch (WSS), or implemented by using a multiplexer and a demultiplexer. An implementation of the second multiplexer/demultiplexer board 401 is similar to the implementation of the first multiplexer/demultiplexer board 204, and details are not described herein again.

It should be noted that, in the optical transmission device 400, the protection line board is optional.

In the foregoing embodiment, services of the tributary board and the line board are scheduled by the electric cross unit. In a possible implementation, the optical transmission device includes a tributary-line board. A protection multiplexer/demultiplexer board is disposed in the optical transmission device, which can also improve stability of working of the device. The following provides a description with reference to an accompanying drawing and an embodiment.

Figure 7:
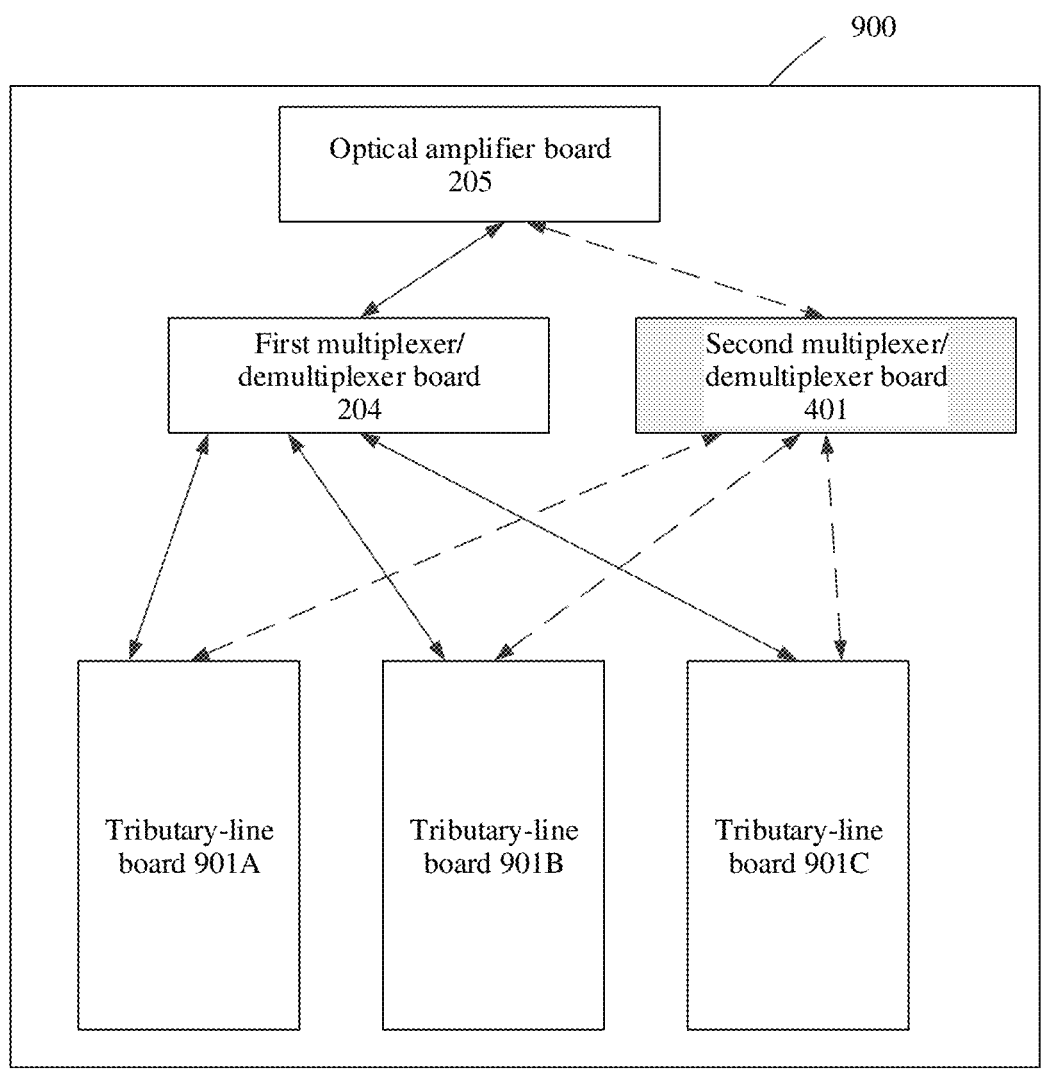
FIG. 7 is a schematic diagram of a structure of still another optical transmission device according to an embodiment of this application.

FIG. 7 is a schematic diagram of a structure of still another optical transmission device 900 according to an embodiment of this application. The optical transmission device 900 includes tributary-line boards 901A to 901C, a first multiplexer/demultiplexer board 204, a second multiplexer/demultiplexer board 401, and an optical amplifier board 205. FIG. 7 shows only three tributary-line boards, one first multiplexer/demultiplexer board 204, and one second multiplexer/demultiplexer board 401. In actual application, other quantities of boards may be disposed based on an actual requirement. For example, 20 tributary-line boards, five first multiplexer/demultiplexer boards 204, and three second multiplexer/demultiplexer boards 401 are disposed. In this embodiment of this application, a quantity of first multiplexer/demultiplexer boards 204 is greater than or equal to a quantity of second multiplexer/demultiplexer boards 401.

First ports of the tributary-line boards 901A to 901C are configured to transmit client service data. The tributary-line boards 901A to 901C and the optical amplifier board 205 include optical connection elements.

When the optical transmission device 900 meets a second preset condition, the optical connection elements are configured to establish optical channels to the second multiplexer/demultiplexer board 401. The second preset condition is described in the foregoing embodiment, and reference may be made to the foregoing embodiment.

In this embodiment, the device 900 is not affected even if the first multiplexer/demultiplexer board 204 is faulty. Therefore, stability of working of the optical transmission device 900 is improved. If the quantity of second multiplexer/demultiplexer boards 401 is less than the quantity of first multiplexer/demultiplexer boards 204, a backup function of a second multiplexer/demultiplexer board 401 may be shared by a plurality of first multiplexer/demultiplexer boards 204, thereby reducing redundancy protection costs for the optical transmission device 900. The second multiplexer/demultiplexer board 401 and the optical connection elements of the upstream and downstream boards of the second multiplexer/demultiplexer board release a binding relationship between the tributary-line board and the first multiplexer/demultiplexer board, and release a binding relationship between the optical amplifier board and the multiplexer/demultiplexer board. Therefore, redundancy protection for the multiplexer/demultiplexer board is implemented at relatively low redundancy protection costs, and reliability of working of the optical transmission device 900 is improved.

In the embodiment of FIG. 5, an implementation of the optical connection element included on the optical amplifier board 205 is described in detail, and details are not described again in this embodiment. The following describes an implementation of the optical connection elements disposed on the tributary-line boards 901A to 901C.

For example, in the tributary-line board 901A, a first connection sub-element may be an optical selection element or an optical splitting element, and a second connection sub-element may be an optical selection element. The optical selection element as a first connection sub-element implements selective transmission of an optical signal, that is, selectively sends the optical signal to the second multiplexer/demultiplexer board 401, the optical splitting element as a first connection sub-element respectively sends an optical signal to the first multiplexer/demultiplexer board 204 and the second multiplexer/demultiplexer board 401, and the optical selection element as a second connection sub-element implements selective reception of an optical signal, that is, selectively receives an optical signal from the second multiplexer/demultiplexer board 401.

A manner in which an optical connection element is disposed on the tributary-line board 901A of the optical transmission device 900 is basically the same as the manner in which an optical connection element is disposed on the active line board 203A of the optical transmission device 400, and reference may be made to FIG. 4.

Optionally, the optical transmission device 900 may further include a second controller. The tributary-line boards 901A to 901C, the first multiplexer/demultiplexer board 204, the second multiplexer/demultiplexer board 401, and the optical amplifier board 205 may be all electrically connected to the second controller. When the optical transmission device 900 meets the second preset condition, the second controller is configured to control each working tributary-line board and the optical amplifier board 205 to establish an optical channel to the second multiplexer/demultiplexer board 401. An implementation in which the second controller determines a fault detection result and controls the boards is similar to that of the first controller, and reference may be made to the first controller described in the foregoing embodiment.

For any one of the optical transmission devices 200, 400, and 900, the boards included in the device may be distributed in a relatively small space range, to form an integrated optical transmission device. For example, the boards are disposed or integrated in one device room. Alternatively, the boards included in the device may be distributed in a relatively large space range, to form a plurality of sub-devices separated from each other. For example, the tributary board, the electric cross unit, and the multiplexer/demultiplexer board of the optical transmission device 200 are disposed on a first sub-device, the optical amplifier board is disposed on a second sub-device, and the first sub-device and the second sub-device are respectively located in different device rooms. A spatial form of the optical transmission device and a distribution position of the board are not limited in the embodiments of this application.

Based on the optical transmission devices shown in FIG. 2 and FIG. 3, this application further provides an optical transmission system. The following describes a specific implementation of the system with reference to an embodiment and FIG. 1.

The optical transmission scenario shown in FIG. 1 also shows an optical transmission system, including the optical transmission device C1 and the optical transmission device C2. C1 and C2 may be optical transmission devices shown in FIG. 2 and FIG. 3.

A second port of an optical amplifier board 205 of the optical transmission device C1 is optically connected to a second port of an optical amplifier board 205 of the optical transmission device C2. Specifically, the two second ports may be connected through an optical fiber. At least one optical amplifier site is further disposed on a transmission path between the optical transmission devices C1 and C2. In this case, the second port of the optical amplifier board 205 of the optical transmission device C1 may be connected to the second port of the optical amplifier board 205 of the optical transmission device C2 through the at least one optical amplifier site.

Because functions of each board type of the optical transmission device C1 in the first transmission direction and the second transmission direction are described in detail in the foregoing embodiment, details are not described again in this embodiment of the system. For the optical transmission device C1, if a first preset condition is met, an active line board is switched to a protection line board, and the protection line board performs corresponding work.

In the optical transmission system, optical transmission may be performed along two opposite directions. For functions of boards of the optical transmission device C2 in the optical transmission system in a signal processing process and an implementation of enabling a protection line board, refer to the foregoing description.

In the optical transmission system provided in the foregoing embodiment, because protection line boards of the optical transmission devices C1 and C2 may establish connections to upstream and downstream boards (multiplexer/demultiplexer boards and electric cross units), when either of the optical transmission devices meets the first preset condition, an electric cross unit performs an operation of copying or scheduling client service data that is to be processed by an active line board, so that a protection line board may be enabled in the optical transmission device to function in place of the active line board. This implements redundancy protection for the optical transmission system. Because a quantity of protection line boards is less than a quantity of active line boards, a protection function of a protection line board may be shared by a plurality of active line boards of an optical transmission device to which the protection line board belongs, thereby reducing device costs.

If the optical transmission devices C1 and C2 in the system are the optical transmission device shown in FIG. 3 or the optical transmission device shown in FIG. 7, during optical transmission of the optical transmission devices C1 and C2 in the system, when a second preset condition is further met, a second multiplexer/demultiplexer board 401 may work in place of a first multiplexer/demultiplexer board 204. The second multiplexer/demultiplexer board 401 of the optical transmission device improves reliability of working of the optical transmission system.

Based on the optical transmission devices shown in FIG. 2 and FIG. 3, this application further provides an optical transmission method. The following describes a specific implementation of the method with reference to an embodiment by using a local optical transmission device as a description body. The optical transmission method provided in this embodiment of this application includes: When the optical transmission device meets a first preset condition, the electric cross unit 202 of the optical transmission device copies or schedules, to the protection line board 203D, client service data that is to be processed by an active line board, and the first multiplexer/demultiplexer board performs multiplexing and demultiplexing in cooperation with the protection line board.

In this method embodiment, it is assumed that the first multiplexer/demultiplexer board works normally.

For example, if the active line board 203C is faulty, the electric cross unit 202 schedules, to the protection line board 203D, client service data that is to be processed by the active line board 203C. For another example, if a line board switching instruction received by the optical transmission device instructs to switch from the active line board 203C to the protection line board 203D, the electric cross unit 202 schedules, to the protection line board 203D, client service data that is to be processed by the active line board 203C.

For ease of understanding the optical transmission method provided in this embodiment of this application, the following separately describes, from two transmission directions, operations performed by the optical transmission device when the optical transmission device meets the first preset condition.

In a first transmission direction, the tributary board 201 receives client service data; the electric cross unit 202 copies or schedules, to the protection line board 203D, the client service data that is to be processed by an active line board (which is faulty or needs to be switched); the protection line board 203D performs electrical-to-optical conversion on the client service data; the first multiplexer/demultiplexer board 204 receives an optical signal provided by the protection line board 203D, to perform multiplexing; and the optical amplifier board 205 amplifies a multiplexed optical signal, and transmits an amplified optical signal to a peer transmission device, where the optical signal carries the client service data.

In a second transmission direction, the optical amplifier board 205 receives and amplifies an optical signal of the peer device; the first multiplexer/demultiplexer board 204 demultiplexes an amplified optical signal to corresponding line boards, where the corresponding line boards include the protection line board 203D; the protection line board 203D performs optical-to-electrical conversion on a received optical signal and then provides client service data to the electric cross unit 202; and the electric cross unit 202 performs scheduling to send, to a client side through the first port of the tributary board 201, the client service data obtained through processing by the protection line board 203D.

In the optical transmission device 200 or 400 to which the method is applied, because the quantity of protection line boards is less than the quantity of active line boards, that is, the line boards in the optical transmission device are not subject to 1:1 dual configurations, a protection function of a protection line board may be shared by a plurality of active line boards, so that redundancy protection costs can be reduced.

For the optical transmission device 400 shown in FIG. 3, this application further provides an optical transmission method, to improve reliability of working of the optical transmission device 400. The optical transmission device 400 shown in FIG. 3 further includes the second multiplexer/demultiplexer board 401 in addition to the first multiplexer/demultiplexer board 204. The optical transmission method includes: when the optical transmission device 400 meets a second preset condition, establishing an optical channel between the second multiplexer/demultiplexer board 401 and a working line board in the active line board and the protection line board, and establishing an optical channel between the optical amplifier board 205 and the second multiplexer/demultiplexer board 401.

For the optical transmission device shown in FIG. 7, this application further provides an optical transmission method, to improve reliability of working of the optical transmission device 900. The optical transmission device shown in FIG. 7 further includes the second multiplexer/demultiplexer board 401 in addition to the first multiplexer/demultiplexer board 204. The optical transmission method includes: when the optical transmission device 900 meets a second preset condition, establishing an optical channel between the tributary-line board and the second multiplexer/demultiplexer board 401, and establishing an optical channel between the optical amplifier board 205 and the second multiplexer/demultiplexer board 401.

By performing the foregoing operations, work of the first multiplexer/demultiplexer board 204 in the optical transmission devices in FIG. 3 and FIG. 7 is switched to the second multiplexer/demultiplexer board 401. Therefore, even if the first multiplexer/demultiplexer board 204 is faulty, the optical transmission device may enable the second multiplexer/demultiplexer board 401 to process and transmit an optical signal, so that the optical transmission device works normally. It can be learned that working reliability of the optical transmission devices shown in FIG. 3 and FIG. 7 is improved.

It should be understood that in this application, "at least one" means "one or more", and "a plurality of" means "two or more". The term "and/or" is used to describe an association relationship between associated objects and represents that three relationships may exist. For example, "A and/or B" may represent as follows: Only A exists, both A and B exist, and only B exists. A and B may be singular or plural. The character "/" generally indicates an "or" relationship between associated objects. The term "at least one of the following items" or a similar expression thereof indicates any combination of these items, including a single item or any combination of a plurality of items. For example, at least one of a, b, or c may indicate a, b, c, a and b, a and c, b and c, or a, b, and c, where a, b, and c may be singular or plural.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. An optical transmission device, comprising:
   a tributary board, configured to receive a first optical signal carrying client service data, and convert the first optical signal into an electrical signal, wherein the electrical signal is an optical data unit k (ODUk) signal;
   an electric cross unit, configured to receive the electrical signal from the tributary board;
   one or more active line boards;
   one or more protection line boards;

a first multiplexer/demultiplexer board;
a second multiplexer/demultiplexer board; and
an optical amplifier board;
wherein a quantity of the one or more protection line boards is less than a quantity of the one or more active line boards;
wherein the tributary board, the one or more active line boards, and the one or more protection line boards are electrically connected to the electric cross unit;
wherein the one or more active line boards, the one or more protection line boards, and the optical amplifier board are optically connected to the first multiplexer/demultiplexer board;
wherein a second port of the optical amplifier board is configured to transmit an optical signal that carries the client service data;
wherein when a first preset condition is met, the electric cross unit is configured to copy or schedule, to the one or more protection line boards, the electrical signal that was to be processed by the one or more active line boards, and the first multiplexer/demultiplexer board is configured to perform multiplexing on optical signals carrying the client service data that is processed by the one or more protection line boards; and
wherein when a second preset condition is met, an optical connection element of a first active line board of the one or more active line boards is configured to establish an optical channel between the first active line board and the second multiplexer/demultiplexer board, an optical connection element of a first protection line board of the one or more protection line boards is configured to establish an optical channel between the first protection line board and the second multiplexer/demultiplexer board, and an optical connection element of the optical amplifier board is configured to establish an optical channel between the optical amplifier board and the second multiplexer/demultiplexer board.

2. The optical transmission device according to claim 1, wherein
the one or more active line boards, the one or more protection line boards, and the optical amplifier board each comprise a respective optical connection element.

3. The optical transmission device according to claim 2, wherein each optical connection element comprises an optical selection element or an optical splitting element, and two output ends of each optical splitting element are respectively connected to the first multiplexer/demultiplexer board and the second multiplexer/demultiplexer board.

4. The optical transmission device according to claim 3, wherein each optical selection element is an optical switch or a wavelength selective element.

5. The optical transmission device according to claim 2, further comprising a first controller, wherein the one or more active line boards, the one or more protection line boards, the first multiplexer/demultiplexer board and the optical amplifier board are electrically connected to the first controller and
wherein when the second preset condition is met, the first controller is configured to control a working line board in the one or more active line boards and the one or more protection line boards and to control the optical amplifier board to establish respective optical channels with the second multiplexer/demultiplexer board.

6. The optical transmission device according to claim 2, wherein the second preset condition comprises: the first multiplexer/demultiplexer board is faulty, or the optical transmission device receives a multiplexer/demultiplexer board switching instruction.

7. The optical transmission device according to claim 1, wherein the first preset condition comprises: at least one active line board is faulty, or the optical transmission device receives a line board switching instruction.

8. The optical transmission device according to claim 1, wherein the first multiplexer/demultiplexer board comprises a wavelength selective switch (WSS), or the first multiplexer/demultiplexer board comprises a multiplexer (MUX) and a demultiplexer (DEMUX).

9. An optical transmission system, comprising a first optical transmission device and a second optical transmission device, wherein the first optical transmission device comprises:
a tributary board, configured to receive a first optical signal carrying client service data, and convert the first optical signal into an electrical signal, wherein the electrical signal is an optical data unit k (ODUk) signal;
an electric cross unit, configured to receive the electrical signal from the tributary board;
one or more active line boards;
one or more protection line boards;
a first multiplexer/demultiplexer board;
a second multiplexer/demultiplexer board; and
an optical amplifier board;
wherein a quantity of the one or more protection line boards is less than a quantity of the one or more active line boards;
wherein the tributary board, the one or more active line boards, and the one or more protection line boards are electrically connected to the electric cross unit;
wherein the one or more active line boards, the one or more protection line boards, and the optical amplifier board are optically connected to the first multiplexer/demultiplexer board;
wherein a second port of the optical amplifier board is configured to transmit an optical signal that carries the client service data;
wherein when a first preset condition is met, the electric cross unit is configured to copy or schedule, to the one or more protection line boards, the electrical signal that was to be processed by the one or more active line boards, and the first multiplexer/demultiplexer board is configured to perform multiplexing on optical signals carrying the client service data that is processed by the one or more protection line boards;
wherein the second port of the optical amplifier board of the first optical transmission device is optically connected to the second optical transmission device;
wherein when a second preset condition is met, an optical connection element of a first active line board of the one or more active line boards is configured to establish an optical channel between the first active line board and the second multiplexer/demultiplexer board, an optical connection element of a first protection line board of the one or more protection line boards is configured to establish an optical channel between the first protection line board and the second multiplexer/demultiplexer board, and an optical connection element of the optical amplifier board is configured to establish an optical channel between the optical amplifier board and the second multiplexer/demultiplexer board;
wherein in a first transmission direction, the first optical transmission device is configured to receive the client service data, process the client service data, and send, to the second optical transmission device through the second port of the optical amplifier board, a processed optical signal that carries the client service data; and when the first preset condition is met, the first optical transmission device is configured to enable the one or more protection line boards; and in a second transmission direction, the first optical transmission device is configured to receive an optical signal from the second optical transmission device through the second port of the optical amplifier board, process the optical signal, convert the optical signal into received client service data, and send the received client service data to a client side; and when the first preset condition is met, the first optical transmission device is configured to enable the one or more protection line boards.

10. The system according to claim 9, wherein the second port of the optical amplifier board of the first optical transmission device is connected to the second optical transmission device through an optical fiber or at least one optical amplifier site.

11. The optical transmission system according to claim 9, wherein the first preset condition comprises: at least one active line board is faulty, or the first optical transmission device receives a line board switching instruction.

12. The optical transmission system according to claim 11, wherein the second preset condition comprises: the first multiplexer/demultiplexer board is faulty, or the first optical transmission device receives a multiplexer/demultiplexer board switching instruction.

13. The optical transmission system according to claim 9, wherein the one or more active line boards, the one or more protection line boards, and the optical amplifier board each comprise a respective optical connection element.

14. The optical transmission system according to claim 13, wherein each optical connection element comprises an optical selection element or an optical splitting element, and two output ends of each optical splitting element are respectively connected to the first multiplexer/demultiplexer board and the second multiplexer/demultiplexer board.

15. The optical transmission system according to claim 14, wherein each optical selection element is an optical switch or a wavelength selective element.

16. The optical transmission system according to claim 13, wherein the first optical transmission device further comprises a first controller, wherein the one or more active line boards, the one or more protection line boards, the first multiplexer/demultiplexer board and the optical amplifier board are electrically connected to the first controller and wherein when the second preset condition is met, the first controller is configured to control a working line board in the one or more active line boards and the one or more protection line boards and to control the optical amplifier board to establish respective optical channels with the second multiplexer/demultiplexer board.

17. The optical transmission system according to claim 9, wherein the first multiplexer/demultiplexer board comprises a wavelength selective switch (WSS), or the first multiplexer/demultiplexer board comprises a multiplexer (MUX) and a demultiplexer (DEMUX).

18. An optical transmission method, applied to an optical transmission device comprising: a tributary board, an electric cross unit, an active line board, a protection line board, a first multiplexer/demultiplexer board, a second multiplexer/demultiplexer board, and an optical amplifier board, and the method comprising:

receiving, by the tributary board, a first optical signal carrying client service data, converting, by the tributary board, the first optical signal into an electrical signal, wherein the electrical signal is an optical data unit k (ODUk) signal;

receiving, by the electric cross unit, the electrical signal from the tributary board;

when a first preset condition is met, copying or scheduling, by the electric cross unit to the protection line board, the electrical signal that was to be processed by the active line board;

when a second preset condition is met, establishing, by optical connection elements comprised on the active line board and the protection line board, an optical channel between a working line board in the active line board and the protection line board and the second multiplexer/demultiplexer board; and establishing, by an optical connection element comprised on the optical amplifier board, an optical channel between the optical amplifier board and the second multiplexer/demultiplexer board; and performing, by the first multiplexer/demultiplexer board, multiplexing on optical signals carrying the client service data that is processed by the protection line board.

19. The method according to claim 18, wherein copying or scheduling, by the electric cross unit to the protection line board, the electrical signal that was to be processed by the active line board, and performing, by the first multiplexer/demultiplexer board, the multiplexing comprises:

in a first transmission direction, copying or scheduling, by the electric cross unit to the protection line board, the electrical signal that was to be processed by the active line board; performing, by the protection line board, electrical-to-optical conversion on the client service data to generate an optical signal; receiving, by the first multiplexer/demultiplexer board, the optical signal generated by the protection line board, to perform multiplexing on the optical signal; amplifying, by the optical amplifier board, a multiplexed optical signal to generate a first amplified optical signal; and transmitting the first amplified optical signal to a peer transmission device, wherein the first amplified optical signal carries the client service data; and in a second transmission direction, receiving and amplifying, by the optical amplifier board, an optical signal of the peer transmission device to generate a second amplified optical signal; demultiplexing, by the first multiplexer/demultiplexer board, the second amplified optical signal to corresponding line boards, wherein the corresponding line boards comprise the protection line board; performing, by the protection line board, optical-to-electrical conversion on a received optical signal to generate received client service data, and providing, by the protection line board, the received client service data to the electric cross unit; and performing, by the electric cross unit, scheduling to send the received client service data to a client side through a first port of the tributary board.

20. The method according to claim 18, wherein:

the first preset condition comprises at least one active line board is faulty, or the first optical transmission device receives a line board switching instruction; and the second preset condition comprises the first multiplexer/demultiplexer board is faulty, or the first optical transmission device receives a multiplexer/demultiplexer board switching instruction.

\* \* \* \* \*